(12) United States Patent
Michiuchi et al.

(10) Patent No.: US 11,339,096 B1
(45) Date of Patent: May 24, 2022

(54) TUNGSTEN CARBIDE POWDER

(71) Applicant: Sumitomo Electric Industries, Ltd., Osaka (JP)

(72) Inventors: Masato Michiuchi, Osaka (JP); Takamasa Onoki, Osaka (JP); Katsumi Okamura, Osaka (JP); Takayuki Fudo, Toyama (JP); Takehiko Hayashi, Toyama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/603,007

(22) PCT Filed: Apr. 21, 2020

(86) PCT No.: PCT/JP2020/017137
§ 371 (c)(1),
(2) Date: Oct. 12, 2021

(87) PCT Pub. No.: WO2020/230542
PCT Pub. Date: Nov. 19, 2020

(30) Foreign Application Priority Data

May 13, 2019 (JP) .............................. JP2019-090778

(51) Int. Cl.
*C04B 35/56* (2006.01)
(52) U.S. Cl.
CPC .. *C04B 35/5626* (2013.01); *C04B 2235/3847* (2013.01); *C04B 2235/785* (2013.01); *C04B 2235/85* (2013.01)

(58) Field of Classification Search
CPC .................................................. C04B 35/5626
See application file for complete search history.

(56) References Cited

U.S. PATENT DOCUMENTS

| | | | |
|---|---|---|---|
| 6,511,551 B2 * | 1/2003 | Kim ........................ | C22C 1/053 148/237 |
| 7,514,061 B2 * | 4/2009 | Sandberg ................ | C22C 1/055 423/440 |
| 2002/0043130 A1 * | 4/2002 | Kim ........................ | C22C 1/053 75/236 |
| 2005/0036934 A1 | 2/2005 | Sandberg et al. | |

FOREIGN PATENT DOCUMENTS

| | | |
|---|---|---|
| CN | 106219547 A | 12/2016 |
| JP | 5-147916 A | 6/1993 |
| JP | 10-212165 A | 8/1998 |
| JP | 2005-60224 A | 3/2005 |
| JP | 2005-335997 A | 12/2005 |
| JP | 2009-242181 A | 10/2009 |

OTHER PUBLICATIONS

Decision to Grant dated Dec. 8, 2020, received for JP Application 2020-551591, 5 pages including English Translation.

\* cited by examiner

*Primary Examiner* — Karl E Group
(74) *Attorney, Agent, or Firm* — Xsensus LLP

(57) ABSTRACT

A tungsten carbide powder 1 includes bonded bodies 10 each including a plurality of tungsten carbide crystal grains 11, in which the bonded bodies 10 include, at a grain boundary 11a between the plurality of tungsten carbide crystal grains 11, a chromium-concentrated region 12 which has a chromium concentration higher than that in the tungsten carbide crystal grains 11.

4 Claims, 8 Drawing Sheets

TEM PHOTOGRAPH (LOW MAGNIFICATION)

TUNGSTEN CARBIDE POWDER

CROSS-REFERENCE TO RELATED APPLICATIONS

The present application is based on PCT filing PCT/JP2020/017137, filed Apr. 21, 2020, which claims priority to JP 2019-090778, filed May 13, 2019, the entire contents of each are incorporated herein by reference.

TECHNICAL FIELD

The present invention relates to a tungsten carbide powder. The present application is based upon and claims the benefit of priority from Japanese Patent Application No. 2019-090778, filed May 13, 201 the entire contents of which are incorporated herein by reference.

BACKGROUND ART

Hitherto, in order to enhance the hardness and flexural strength of cemented carbides, high-quality, submicron, fine tungsten carbide powders have been improved. Examples thereof are disclosed, for example, in Japanese Unexamined Patent Application Publication No. 2009-242181 (PTL 1), Japanese Unexamined Patent Application Publication No. 2005-335997 (PTL 2), and Japanese Unexamined Patent Application Publication No. 5-147916 (PTL 3).

CITATION LIST

Patent Literature

PTL 1: Japanese Unexamined Patent Application Publication No. 2009-242181
PTL 2: Japanese Unexamined Patent Application Publication No. 2005-335997
PTL 3: Japanese Unexamined Patent Application Publication No. 5-147916

SUMMARY OF INVENTION

A tungsten carbide powder according to the present disclosure includes bonded bodies each including a plurality of tungsten carbide crystal grains, in which the bonded bodies include, at a grain boundary between the plurality of tungsten carbide crystal grains, a chromium-concentrated region which has a chromium concentration higher than that in the tungsten carbide crystal grains.

DESCRIPTION OF EMBODIMENTS

Figure 1:
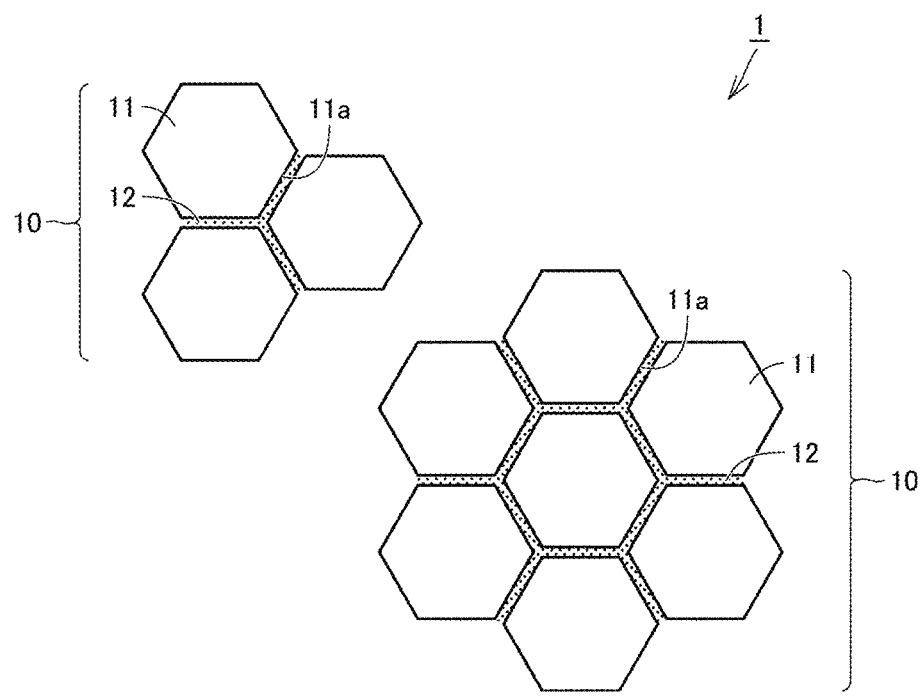
FIG. 1 is a schematic diagram of a tungsten carbide powder according to an embodiment.

Problems to be Solved by Present Disclosure

It is required to provide a tungsten carbide powder in which the volume of powder can be reduced, handleability is improved, and sinterability is improved.

Advantageous Effects of Present Disclosure

It is possible to provide a tungsten carbide powder in which the volume of powder can be reduced, handleability is improved, and sinterability is improved.

Description of Embodiments of Present Disclosure

First, embodiments of the present disclosure will be enumerated and described.

In known tungsten carbide powders, when a powder is fine, the volume thereof is large, and the powder is likely to be scattered during handling.

When a cemented carbide is produced by a powder metallurgy process, sintered pores are likely to occur. The reason for this is that it is hard to apply pressing pressure to a fine powder, and the density of a pressed body is decreased. Furthermore, spaces between particles are likely to cause formation of pores.

During sintering, tungsten carbide grains grow abnormally, thus decreasing the strength of the alloy. The reason for this is that, because of Ostwald ripening, in a fine powder, the driving force for grain growth during sintering increases, and selective growth easily occurs.

Detailed Description of Embodiments of Present Disclosure

A tungsten carbide powder according to the present disclosure includes bonded bodies each including a plurality of tungsten carbide crystal grains, in which the bonded bodies include, at a grain boundary between the plurality of crystal grains, a chromium-concentrated region which has a chromium concentration higher than that in the tungsten carbide crystal grains.

In the production of existing fine cemented carbides, basically, fine tungsten carbide powders have been used. In contrast, in the present disclosure, since the tungsten carbide powder is coarser than the existing tungsten carbide powders, the volume of powder is small, and handleability is good, and also, by forming a chromium-concentrated region at a grain boundary of the tungsten carbide crystal grains, pores are unlikely to occur in a sintered compact and the alloy structure can be made uniform.

Preferably, the tungsten carbide powder contains a compound represented by $(W,Cr)_2C$. Since chromium is precipitated as $(W,Cr)_2C$, a cemented carbide having fine crystal grains is easily obtained, and the powder has good sinterability.

Preferably, the tungsten carbide crystal grains have an average crystal grain size of 0.6 μm or less. In this case, sinterability of a fine tungsten carbide raw material can be greatly improved.

Preferably, the chromium concentration in the entire tungsten carbide powder is 0.1% by mass or more and 7.0% by mass or less. In this case, when producing a cemented carbide, characteristics can be maintained.

Preferably, an intensity ratio B/A of a $(W,Cr)_2C$ (321) diffraction intensity B to a tungsten carbide (101) diffraction intensity A measured by synchrotron radiation X-ray diffraction is $4.00 \times 10^{-3}$ or more and $20.00 \times 10^{-3}$ or less. By setting this range, sinterability can be further improved.

The present inventors have performed detailed studies on the relationships among the particle structure of tungsten carbide powder, powder characteristics, and characteristics of a cemented carbide obtained by using this as a raw material. As a result, it has been found that in a bonded body in which crystal grains of tungsten carbide are bonded together, when a chromium-concentrated region is formed at an interface between crystal grains, the volume of powder is small and handling is facilitated, and also, it is possible to produce a good quality cemented carbide having few sintering defects such as alloy pores.

The disclosed tungsten carbide powder, which has been devised on the basis of the studies described above, includes, as shown in FIG. 1, bonded bodies 10 in each of which a plurality of tungsten carbide crystal grains 11 are bonded together. The bonded bodies 10 include, at a grain boundary 11a between the crystal grains, a chromium-concentrated region 12.

The present disclosure can be applied to a tungsten carbide powder having any particle size. In particular, when the present disclosure is applied to a fine powder in which tungsten carbide crystal grains have an average crystal grain size of 0.6 μm or less, more preferably 0.5 μm or less, a large effect can be obtained compared with fine powders produced by existing techniques.

A chromium concentration in the entire tungsten carbide powder is preferably 0.1% by mass or more and 7.0% by mass or less relative to the total concentration of tungsten and chromium. When the chromium concentration is 0.1% by mass or more and 7.0% by mass or less, a sufficient amount of the chromium-concentrated region can be formed. Furthermore, when the chromium concentration is more than 7.0% by mass, the chromium concentration increases at the time of producing a cemented carbide, and there is a possibility that the characteristics of the cemented carbide may be deteriorated.

Furthermore, it is preferable that the tungsten carbide powder according to the present disclosure contain a compound represented by $(W,Cr)_2C$. Since chromium is formed as the compound $(W,Cr)_2C$, the volume of powder is small and handling is facilitated at the time of producing a cemented carbide, and also, it is possible to produce a good quality cemented carbide having few sintering defects such as alloy pores.

Furthermore, in another aspect of the present disclosure, an intensity ratio B/A of a $(W,Cr)_2C$ (321) diffraction intensity B to a tungsten carbide (101) diffraction intensity A measured by synchrotron radiation X-ray diffraction may be $4.00 \times 10^{0.3}$ or more and $20.00 \times 10^{-3}$ or less. When the intensity ratio B/A is less than $4.00 \times 10^{-3}$, the effect of $(W,Cr)_2C$ decreases at the time of producing a cemented carbide. Furthermore, when the intensity ratio B/A is more than $20.00 \times 10^{-3}$, the formation rate of tungsten carbide is decreased, and in the case of not being homogeneously dispersed, the alloy structure is likely to be non-uniform. More preferably, the intensity ratio B/A is $8.00 \times 10^{-4}$ or more and $17.00 \times 10^{-3}$ or less.

Such a tungsten carbide powder can be suitably produced by the following production process.

An embodiment of a method for producing a tungsten carbide powder according to the present disclosure includes, for example, a first step in which a tungsten oxide powder, a chromium-containing solution, and a carbon source powder are prepared and mixed to obtain a mixed powder, a second step in which the mixed powder is heat-treated in a hydrogen atmosphere to obtain a reduced powder, and a third step in which the reduced powder is heat-treated in an inert atmosphere or in a hydrogen-containing atmosphere at a temperature higher than that in the second step to obtain a tungsten carbide powder. Examples of a compound that can be used as the chromium-containing solution include chromium chloride, chromium nitrate, chromium sulfate, chromium acetate, and chromium phosphate.

Next, Examples of the present disclosure will be described. Note that Examples are merely embodiments of the invention.

EXAMPLES (Production of Mixed Powder)

A tungsten trioxide powder having an average particle size of 2.0 μm serving as a tungsten oxide powder, chromium acetate (Wako Pure Chemical Industries, Ltd.) serving as a chromium-containing solution, and a carbon powder having an average particle sire of 1.0 μm serving as a carbon source powder are prepared. The tungsten oxide powder and the carbon source powder are introduced into a rotating-blade type mixer, and chromium acetate is dissolved in pure water and adjusted to a desired concentration. The concentration of the chromium-containing solution can be appropriately adjusted by a person skilled in the art. Here, an adjustment was made to obtain a 40% by volume aqueous chromium acetate solution. While stirring the powder with the mixer, the chromium-containing solution is sprayed to the powder so as to obtain a desired chromium concentration, and these are mixed (first step). The mixer used in this process can be appropriately selected by a person skilled in the art. For example, a Henschel mixer manufactured by Nippon Coke & Engineering Co., Ltd. may be used. Furthermore, a mixer other than the rotating-blade type mixer may be used. Here, mixing was performed under the conditions in which the diameter of the rotating blade was 60 cm, the peripheral speed was 1,884 m/min, and the mixing time was 30 minutes. The mixing conditions are not particularly limited as long as sufficient mixing is achieved.

After mixing, the mixed powder is taken out and dried to obtain a dry mixed powder.

(Production of Reduced Powder)

The mixed powder was subjected to reduction treatment in a hydrogen atmosphere at a temperature of 800 to 1,000° C. to obtain a reduced powder which contains tungsten, carbon, and chromium (second step). In Examples, for all the powders, reduction heat treatment was conducted under atmospheric pressure hydrogen flow at a temperature of 900° C.

(Production of Tungsten Carbide Powder)

Furthermore, the reduced powder was placed in a carbon case having an internal volume of 150 mm in width×150 mm in length×75 mm in height and heat-treated, in an inert atmosphere, in Examples, in a hydrogen atmosphere under atmospheric pressure flow, at 1,000 to 1,400° C. to obtain a tungsten carbide powder (third step). The heat treatment conditions for each powder are described in Tables 1 and 2.

istics of the powder were measured. The results thereof are shown in Tables 1 and 2. In the present disclosure, the

TABLE 1

| Sample name | Production condition Heat treatment temperature | Characteristics of WC powder | | | | | | Defects in cemented carbide | |
|---|---|---|---|---|---|---|---|---|---|
| | | Cr concentration (mass %) | Cr-concentrated region | B/A value (×10$^{-3}$) | Average crystal grain size (μm) | FSSS diameter (μm) | Tap density (cm$^3$/100 g) | Pore | Coarsened WC particle |
| Example 1 | 1100° C. | 2.29 | Present | 11.38 | 0.11 | 0.72 | 20.5 | A02B02 | 2 |
| Example 2 | 1200° C. | 2.29 | Present | 11.97 | 0.20 | 0.70 | 21.0 | A02B02 | 1 |
| Example 3 | 1300° C. | 2.31 | Present | 13.02 | 0.41 | 0.82 | 18.5 | A02B00 | 0 |
| Example 4 | 1400° C. | 2.31 | Present | 11.94 | 0.57 | 1.30 | 17.5 | A02B02 | 0 |
| Example 5 | 1200° C. | 0.98 | Present | 8.13 | 0.23 | 0.72 | 21.0 | A00B00 | 1 |
| Example 6 | 1200° C. | 1.64 | Present | 11.55 | 0.26 | 0.70 | 20.5 | A00B00 | 1 |
| Example 7 | 1200° C. | 4.31 | Present | 15.42 | 0.15 | 0.76 | 20.0 | A02B02 | 0 |
| Example 8 | 1200° C. | 5.67 | Present | 16.96 | 0.14 | 0.76 | 20.5 | A02B02 | 0 |
| Example 9 | 1300° C. | 1.63 | Present | 11.64 | 0.45 | 0.84 | 19.0 | A00B00 | 0 |
| Example 10 | 1300° C. | 4.32 | Present | 15.58 | 0.35 | 0.82 | 19.0 | A02B00 | 0 |
| Example 11 | 1250° C. | 1.63 | Present | 11.16 | 0.31 | 0.72 | 21.0 | A02B00 | 1 |
| Example 12 | 1250° C. | 2.98 | Present | 13.91 | 0.28 | 0.72 | 21.0 | A02B00 | 1 |
| Example 13 | 1250° C. | 4.31 | Present | 15.67 | 0.27 | 0.70 | 21.0 | A02B00 | 0 |

TABLE 2

| Sample name | Production condition Heat treatment temperature | Characteristics of WC powder | | | | | | Defects in cemented carbide | |
|---|---|---|---|---|---|---|---|---|---|
| | | Cr concentration (mass %) | Cr-concentrated region | B/A value (×10$^{-3}$) | Average crystal grain size (μm) | FSSS diameter (μm) | Tap density (cm$^3$/100 g) | Pore | Coarsened WC particle |
| Example 14 | 1250° C. | 5.66 | Present | 17.51 | 0.25 | 0.74 | 20.5 | A02B02 | 0 |
| Example 15 | 1250° C. | 6.98 | Present | 18.84 | 0.26 | 0.70 | 21.0 | A04B02 | 0 |
| Example 16 | 1340° C. | 0.97 | Present | 9.63 | 0.52 | 0.92 | 18.5 | A02B00 | 0 |
| Example 17 | 1340° C. | 1.64 | Present | 11.68 | 0.50 | 0.88 | 18.5 | A02B00 | 1 |
| Example 18 | 1340° C. | 2.31 | Present | 12.80 | 0.51 | 0.88 | 19.0 | A02B00 | 0 |
| Example 19 | 1340° C. | 4.31 | Present | 15.75 | 0.46 | 1.00 | 18.0 | A04B02 | 0 |
| Example 20 | 1340° C. | 5.67 | Present | 17.44 | 0.42 | 0.98 | 19.0 | A04B04 | 0 |
| Example 21 | 1200° C. | 0.11 | Present | 4.23 | 0.31 | 0.76 | 21 | A00B00 | 3 |
| Example 22 | 1200° C. | 0.29 | Present | 5.79 | 0.31 | 0.72 | 20.5 | A00B00 | 3 |
| Example 23 | 1200° C. | 0.51 | Present | 7.46 | 0.25 | 0.75 | 20.5 | A00B00 | 0 |
| Example 24 | 1200° C. | 7.94 | Present | 18.98 | 0.12 | 0.75 | 20.5 | A04B02 | 0 |
| Example 25 | 1200° C. | 9.99 | Present | 20.82 | 0.12 | 0.7 | 21 | A08B02 | 0 |

(Principle for Generation of Chromium-Concentrated Region)

The reason why the tungsten carbide powder according to the present disclosure can be obtained by this production method is not yet clear. However, as a result of the studies conducted by the present inventors, it is surmised that the tungsten carbide powder is generated by a phenomenon in which (1) chromium is homogeneously dispersed in particles of a tungsten oxide powder, (2) when metal tungsten particles are generated by reduction of tungsten oxide, (3) chromium is homogeneously dissolved in the metal tungsten particles by heat treatment, and (4) at the time of carburizing, chromium is dissociated in the form of (W,Cr)$_2$C from the metal tungsten, resulting in formation (segregation) at grain boundaries of tungsten carbide.

(Measurement of Physical Properties of Tungsten Carbide Powder)

The produced tungsten carbide powder was packed into a cylindrical ball mill container with an inside diameter of 200 mm at 40% by volume of the internal volume of the container. Cemented carbide balls each having a diameter of 3 mm were also packed into the same container. Disintegration treatment was conducted by adjusting time so that primary particles were not pulverized, and then, characteristics of the powder were measured. The results thereof are shown in Tables 1 and 2. In the present disclosure, the presence of bonded bodies of tungsten carbide crystals is identified by observing a powder cross section with an SEM (Scanning Electron Microscope), chromium-concentrated regions are identified by TEM, the presence of (W,Cr)$_2$C phases is identified by synchrotron radiation X-ray diffraction, the intensity ratio B/A of the (W,Cr)$_2$C (321) diffraction intensity B to the tungsten carbide (101) diffraction intensity A is measured, the Fsss (Fisher sub-sieve sizer) diameter is measured by the Fisher method, the tap density (TV: Tap Volume) described in JIS Z 2512 is measured, and the mass concentration of chromium in the tungsten carbide powder is measured by ICP (Inductively Coupled Plasma).

A method for measuring tungsten carbide crystal grain size will be described in detail below. First, a tungsten carbide powder is embedded in resin, and then, a cross-section sample is produced by ion beam machining. The resulting sample is observed with an SEM. At this time, by using a backscattered electron detector, a channeling contrast image emphasizing the contrast due to a difference in crystal orientation is photographed. An image analysis is performed on this SEM image, and a crystal grain size is calculated. Specifically, a region of 3×3 μm is randomly selected from the channeling contrast image, and five tungsten carbide crystal grains completely contained therein are randomly chosen. Then, by using image analysis software ("WinROOF" by Mitani Corporation), an equivalent circle diameter of each of the crystal grains is calculated. At different positions, this process is repeated five times. An equivalent circle diameter of each of 25 tungsten carbide crystal grains in total is obtained, and the average value thereof is defined as the average crystal grain size of tungsten carbide crystal grains.

Figure 2:
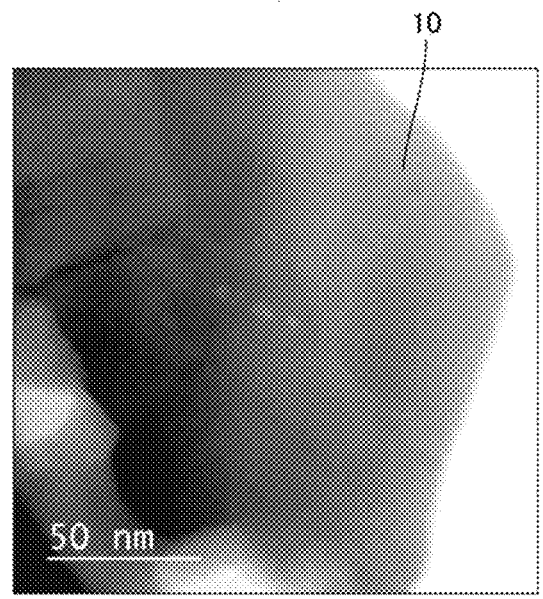
FIG. 2 is a low-magnification TEM photograph of an aggregate constituting a tungsten carbide powder according to Example.
Figure 3:
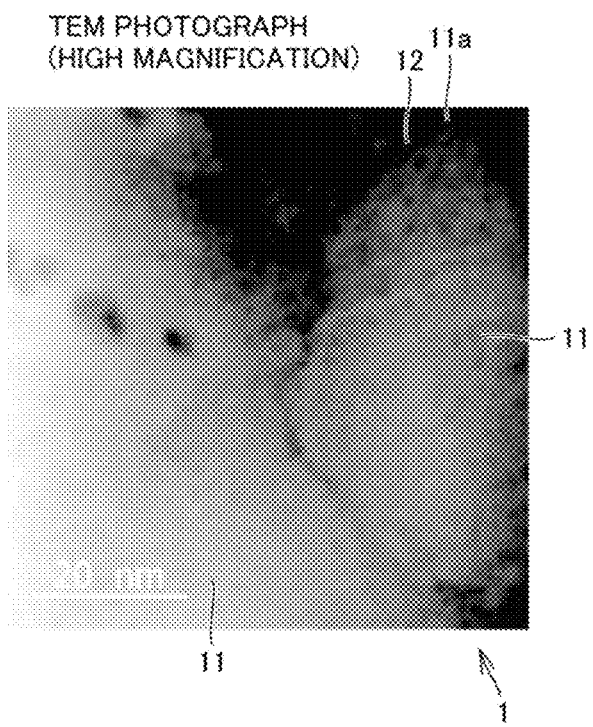
FIG. 3 is a high-magnification TEM photograph of the aggregate constituting the tungsten carbide powder according to Example.
Figure 4:
FIG. 4 is a diagram showing chromium distribution in the tungsten carbide powder.
Figure 5:
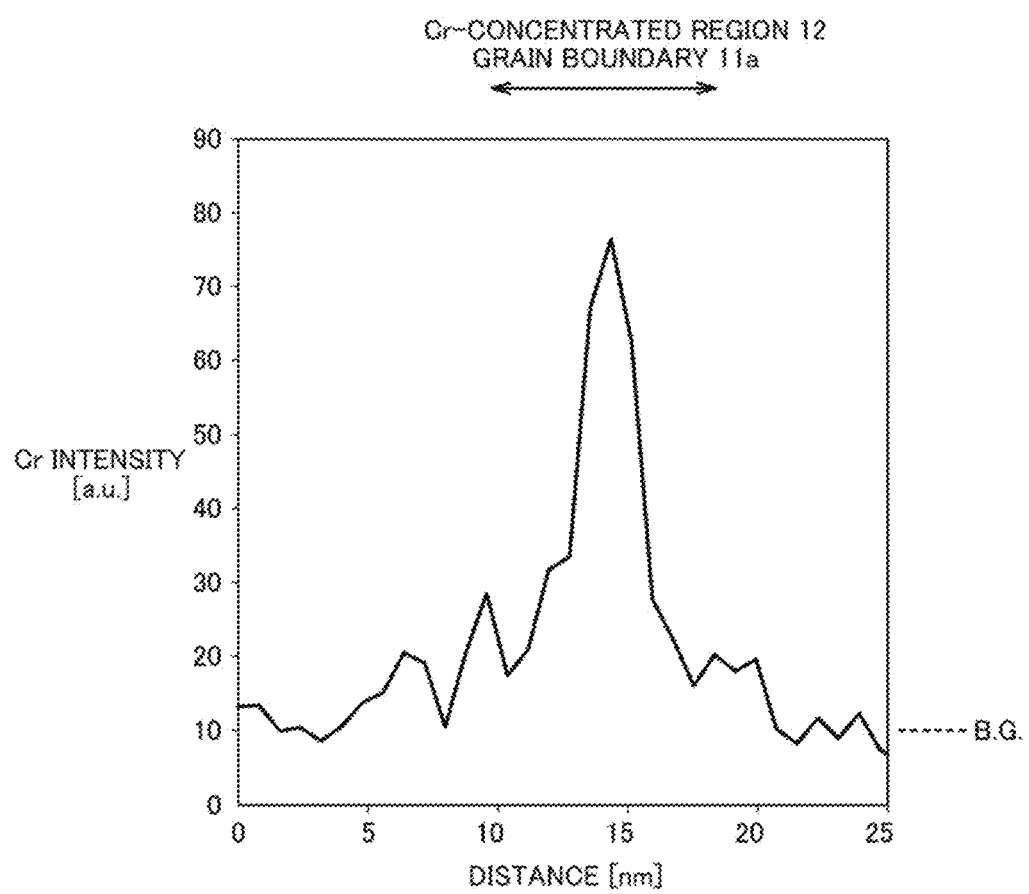
FIG. 5 is a graph showing the chromium concentration in a grain boundary shown in FIG. 4.

FIGS. 2 to 4 show the results of observing the cross-section structure of the tungsten carbide powder of Example 1 with TEM (Transmission Electron Microscope)-EDS (Energy dispersive X-ray spectrometry). FIG. 3 is a photograph showing a portion of the field of view of a photograph shown in FIG. 2, observed with high magnification. FIG. 4 is a diagram showing the results of TEM (Transmission Electron Microscope)-EDS (Energy dispersive X-ray spectrometry) analysis of the chromium concentration in the field of view of FIG. 3. As is evident from FIGS. 2 to 4, the disclosed tungsten carbide powder includes a chromium-concentrated region 12 at a grain boundary 11$a$ of tungsten carbide crystal grains 11. A plurality of crystal grains 11 are bonded together to form a bonded body. In FIG. 4, line analysis of the chromium concentration was performed so as to traverse the grain boundary 11$a$, and as a result, the chromium concentration distribution shown in FIG. 5 was obtained. As shown in FIG. 5, relative to the chromium concentration (B. G.) in the tungsten crystal grains 11, the chromium concentration is high in the chromium-concentrated region 12 present at the grain boundary 11$a$. As is evident from FIGS. 4 and 5, a chromium-concentrated region can be confirmed at the grain boundary 11$a$.

Figure 6:
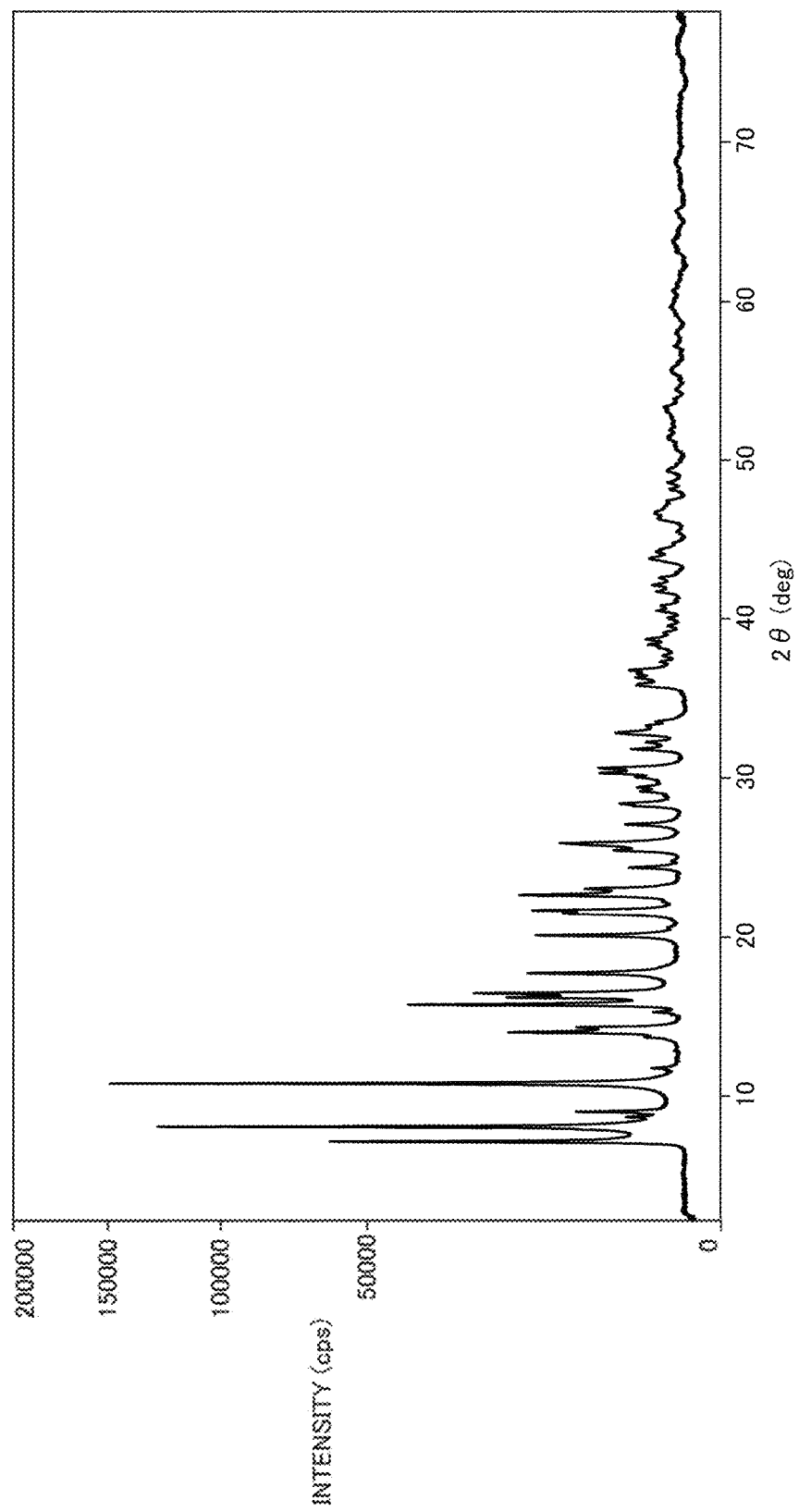
FIG. 6 is a graph showing the results of synchrotron radiation X-ray diffraction performed on the tungsten carbide powder of Example 4.
Figure 7:
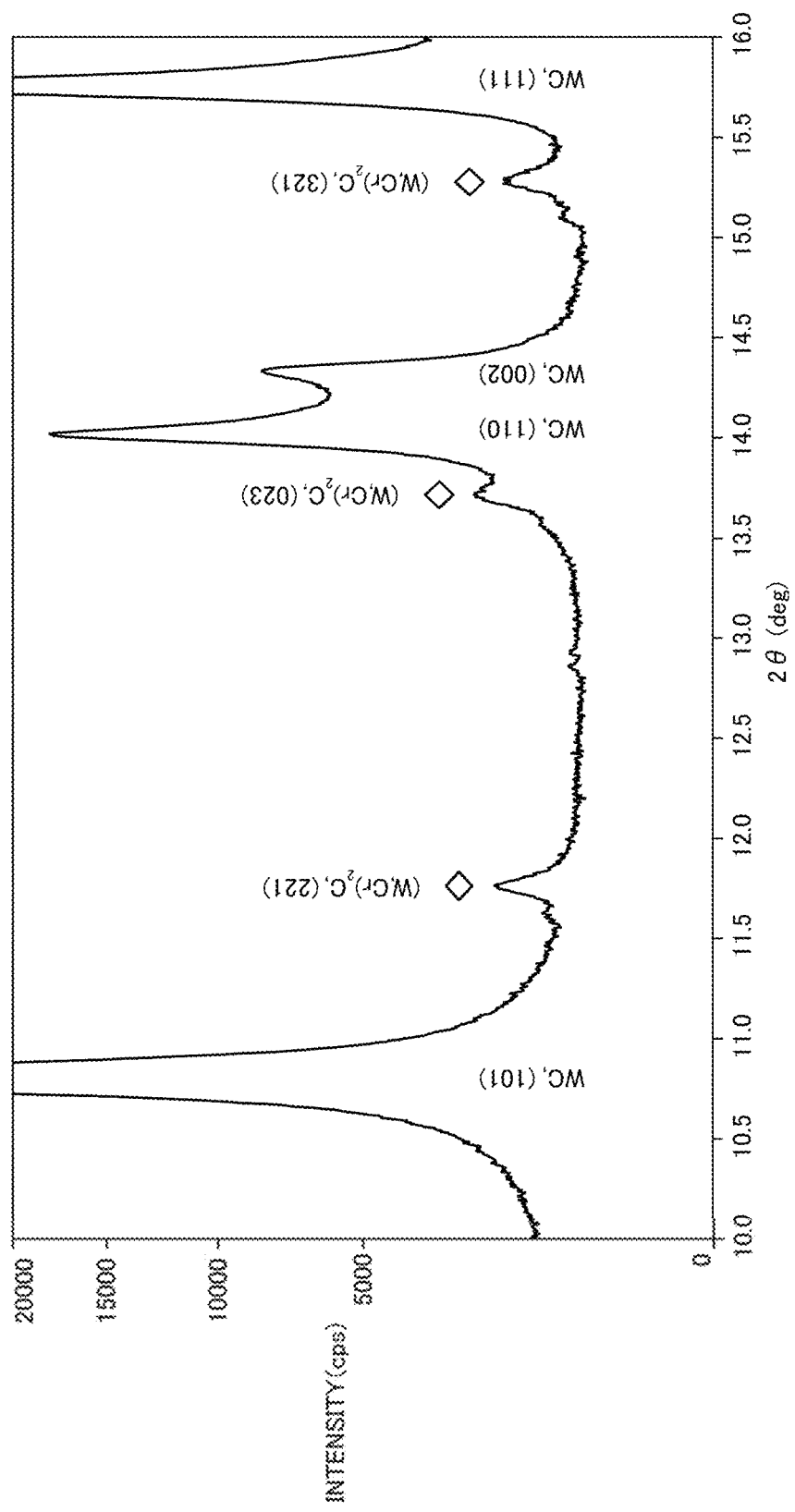
FIG. 7 is a graph which shows an enlarged portion of the diffraction profile of FIG. 6.

FIGS. 6 and 7 show the results of synchrotron radiation X-ray diffraction performed on the tungsten carbide powder of Example 4. FIG. 7 is a graph which shows an enlarged portion of the diffraction profile of FIG. 6. The wavelength of the synchrotron radiation X-ray used as a radiation source was 0.035448 nm, the technique used for measurement was the Debye-Scherrer method (transmission method), the 2θ measurement range was 2 to 78 degrees, the step width was 0.005 degrees, and the exposure time was 60 seconds. In the present disclosure, $(W,Cr)_2C$ refers to a compound that has the same crystal structure as $W_2C$ and has a lower lattice constant than $W_2C$. With regard to the crystal structure of $W_2C$, for example, the information described in ICSD (Inorganic Crystal Structure Database) card No. 43017 or PDF card No. [01-089 2371] issued by ICDD (International Center for Diffraction Data) can be used for reference. In $(W,Cr)_2C$, the W site of $W_2C$ is replaced by and mixed with Cr, resulting in a decrease in lattice constant, and the diffraction peak of $(W,Cr)_2C$ appears at the higher angle side than that of $W_2C$. Specifically, in comparison with the spacing between crystal planes (d1) of $W_2C$ at certain crystal plane indices (hkl), the spacing between crystal planes (d2) of $(W,Cr)_2C$ at the same plane indices is small by 0.5% to 1.5%. For example, as shown in FIG. 7, in the tungsten carbide powder of Example 4, the spacing between crystal planes d1 of the $W_2C$ (321) plane is 0.1348 nm (corresponding to the diffraction angle 2θ=15.110 degrees), while a peak can be confirmed at the position of the diffraction angle 2θ=15.277 degrees (corresponding to a spacing between crystal planes d2 of 0.1333 nm), and d2 is smaller than d1 by 1.07%. This relationship is the same at a spacing between crystal planes other than that of the (321) plane. Accordingly, it is possible to identify the presence of $(W,Cr)_2C$ by analyzing the diffraction profile using a crystal structure in which the spacing between crystal planes is decreased by 0.5% to 1.5% on the basis of $W_2C$. Note that, in the case where an X-ray diffraction device of ordinary size is used, since its angular resolution and brightness are low compared with a synchrotron radiation X-ray device, it is difficult to identify the presence of $(W,Cr)_2C$.

Furthermore, in Examples, in addition to the crystal structure of $(W,Cr)_2C$ determined as described above, by also analysing the crystal structures and diffraction profiles of WC and $W_2C$, the intensity ratio B/A of the $(W,Cr)_2C$ (321) diffraction intensity B to the tungsten carbide (101) diffraction intensity A is obtained. As analysis software, a PDXL manufactured by Rigaku Corporation is used, although not limited thereto. After removal of the background, the WC (101) integrated intensity is considered as the diffraction intensity A and the $(W,Cr)_2C$ (321) integrated intensity is considered as the diffraction intensity B, and the intensity ratio B/A is obtained. Depending on the type of crystal structure database used, it may be stated that a (302) diffraction peak appears in the very vicinity of the $W_2C$ (321) diffraction peak. In such a case, the (321) peak and the (302) peak are not separated, but are combined and regarded as the (321) peak.

Figure 8:
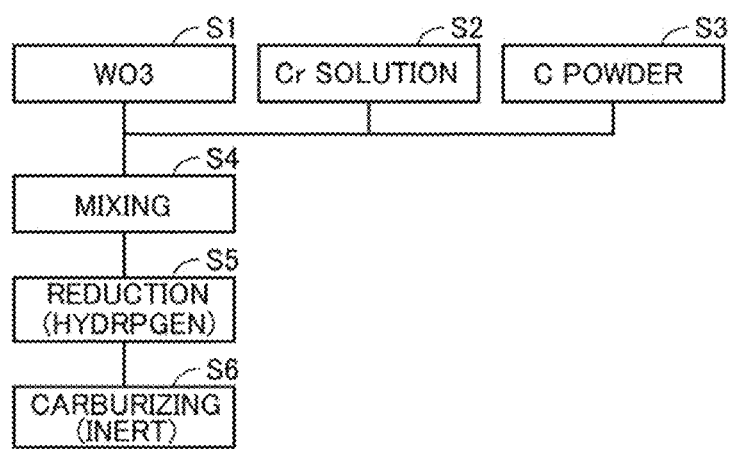
FIG. 8 is a flow chart for explaining a method for producing a tungsten carbide powder according to Example.

FIG. 8 shows an example of a method for producing a tungsten carbide powder according to the present disclosure in Examples. Note that the method for producing a tungsten carbide powder according to the present disclosure is not limited to the flow chart shown in FIG. 8. As shown in FIG. 8, first, as raw materials, a $WO_3$ powder, a chromium powder, and a graphite powder are prepared (steps S1 to S3). These raw material powders are mixed (step S4). The mixed powder is reduced in a reducing atmosphere, such as a hydrogen atmosphere (step S5). The reduced powder is carburized in an inert atmosphere, such as a nitrogen atmosphere (step S6).

(Production of Cemented Carbide in Examples and Comparative Examples)

Next, sinterability of the tungsten carbide powder is confirmed by the following procedure.

First, a tungsten carbide powder and a metal cobalt (hereinafter, Co) powder with a primary particle size of about 2 μm are compounded at a mass ratio of 9:1, and then mixed with a ball mill using φ3 mm cemented carbide balls. In the compounding ratio, calculation is made assuming that the mass of chromium is contained in tungsten carbide. For example, mixing conditions can be such that the rotation rate is 90 rpm, an ethanol solvent is used, and the mixing time is 24 h.

After mixing, a mixed slurry is taken out of the ball mill and dried to obtain a dry powder.

Camphor as a binder is added in an amount of 2% by mass to the dry powder, and the resulting mixture is sifted through a 150 μm mesh sieve to produce a granulated powder.

The granulated powder is press-formed into an SNG432 (ANSI Code) shape with a contact pressure of 9.8 kN/cm², and sintering is performed in a vacuum furnace. Sintering conditions can be appropriately selected within a range that is obvious to a person skilled in the art. For example, the conditions may be such that the rate of temperature rise is 10° C./min, the maximum temperature is 1,350° C., the holding time is 30 min, and a reduced-pressure nitrogen atmosphere (about 133 Pa) is set.

After sintering, the sintered compact is cut in the thickness direction, and the cut surface is subjected to surface grinding with a #400 grit diamond grindstone and finishing with a #3000 grit diamond paste to obtain a microscopic observation sample.

The microscopic observation sample is observed with an optical microscope, and the porosity is determined on the basis of the Japan Cemented Carbide Tool Manufacturer's Association standard CIS006C-2007. Here, in the present description, in order to simplify the expression, when determined to be less than A02 and less than B02, the porosity is expressed as A00 and B00, respectively. Furthermore, by performing corrosion treatment using Murakami's reagent, the number of coarse particles with a particle size of more than 5 μm is counted. The observation of coarse particles is performed from three microscope fields of view at a magnification of 1,500 times, and the total number is compared.

Tables 1 and 2 summarize the characteristics of tungsten carbide powders of Examples produced by the method described above and cemented carbides produced from the tungsten carbide powders. Here, as the production condition, the heat treatment temperature (carburizing temperature) in the third step (firing) is shown.

In the samples of Examples, in the evaluation of defects in the cemented carbide, the number of pores is small, and the number of coarse tungsten carbide particles is small.

Note that, in each of Comparative Examples 1 to 3, instead of the chromium-containing aqueous solution, a chromium oxide ($Cr_2O_3$) powder having an average particle size of 2 μm was used, and the mixing step was carried out by ball mill mixing (ethanol solvent, rotation rate: 90 rpm, 24 h) using φ3 mm cemented carbide balls. Subsequent steps were carried out as in Examples to produce a tungsten carbide powder and a cemented carbide. Furthermore, in each of Comparative Examples 4 and 5, a tungsten carbide powder produced on the basis of the method according to PTL 2 was compounded with chromium carbide ($Cr_3C_2$) and a metal Co powder, and subsequently, alloying was performed by the same method as that of Examples. The powder of Comparative Example 4 is fine and is difficult to be evaluated by Fsss, and therefore, a convened particle site in which spherical particles are assumed from a BET (specific surface area) value is given. In Comparative Example 6, production was performed as in Examples except that the chromium-containing aqueous solution was sprayed to the tungsten trioxide powder such that the chromium concentration of the tungsten carbide powder was the value shown in Table 3. In Comparative Example 7, production was performed as in Examples except that the chromium-containing aqueous solution was not sprayed to the tungsten trioxide powder. The results of Comparative Examples are shown in Table 3.

As shown in Tables 1 to 3, the tungsten carbide powder according to the present disclosure has a small volume of powder and is easy to handle. Therefore, when a cemented carbide is produced, structure defects, such as sintered pores and abnormally grown tungsten carbide, can be reduced, and a good cemented carbide can be obtained.

The tungsten carbide powders of Example 21 and Comparative Example 3 have similar Fsss diameters and have small volumes. However, the former has a small average crystal grain size and a small number of coarsened WC particles in the alloy. Furthermore, when Example 19 and Comparative Example 1, which have the same average crystal grain size, are compared, in the former, the volume is small, and defects in the cemented carbide are satisfactory. That is, it is clear that the tungsten carbide powder according to the present disclosure has a small volume of powder and is easy to handle.

Figure 9:
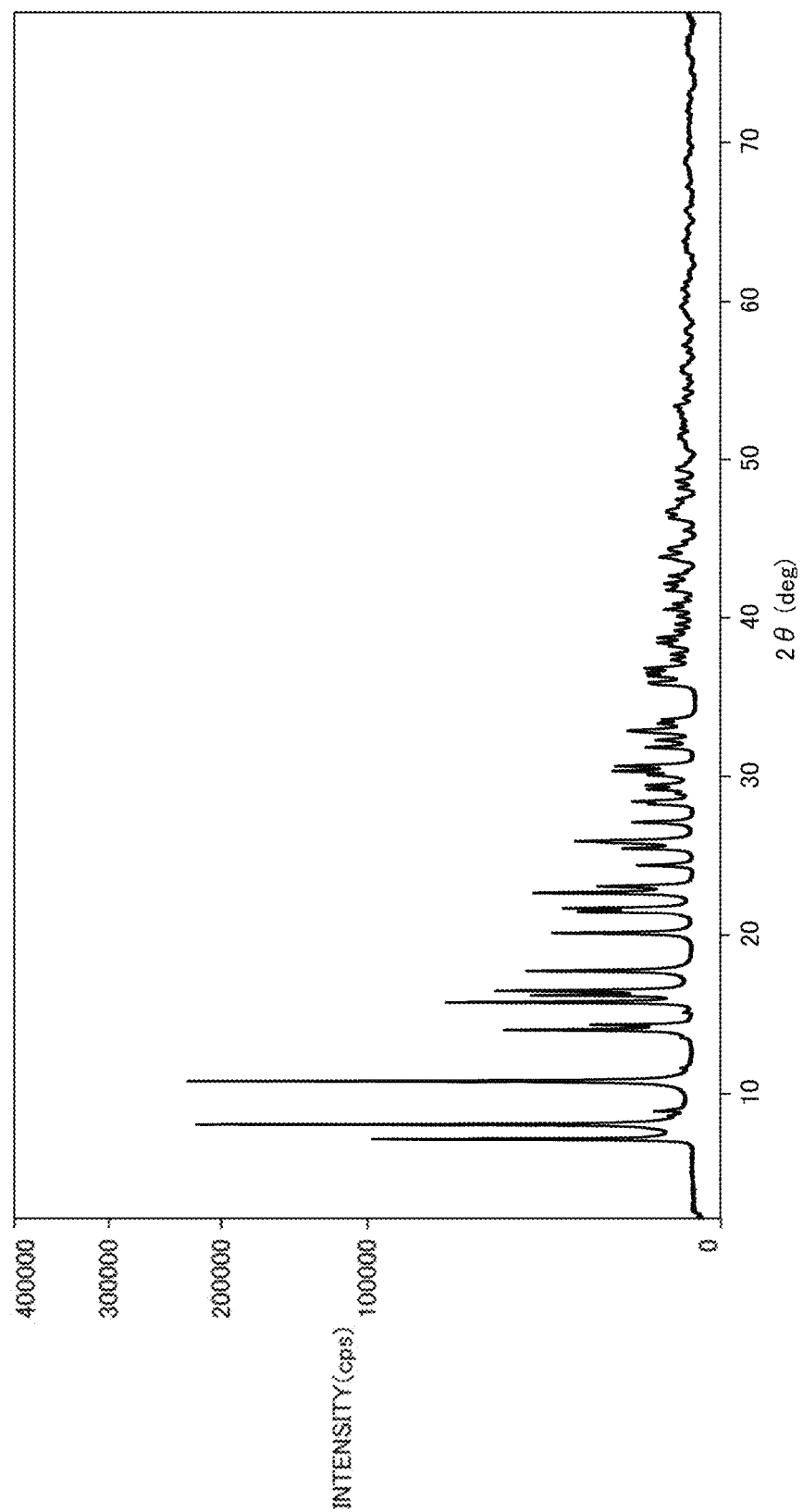
FIG. 9 is a graph showing the results of synchrotron radiation X-ray diffraction performed on the tungsten carbide powder of Comparative Example 3.
Figure 10:
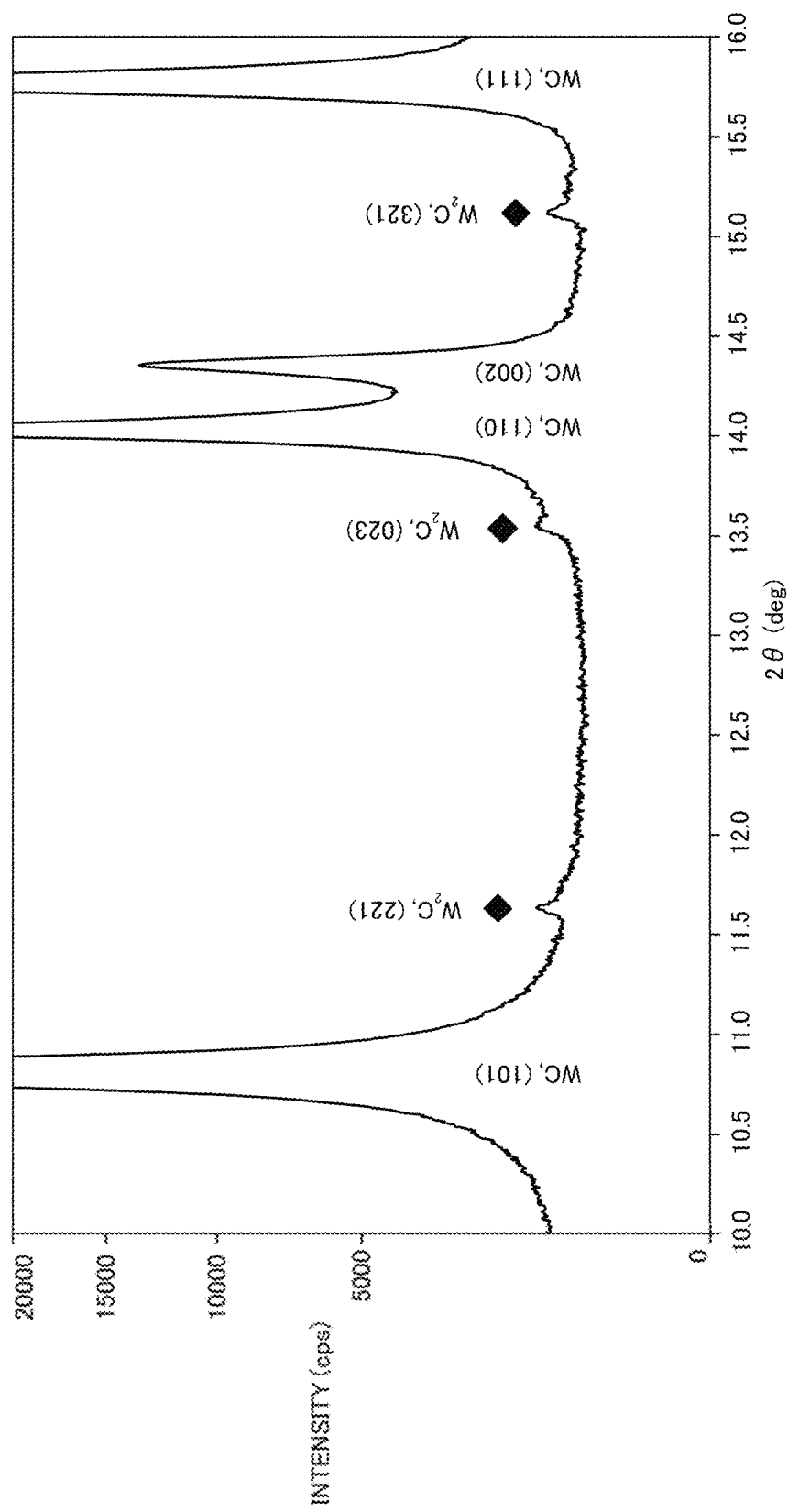
FIG. 10 is a graph which shows an enlarged portion of the diffraction profile of FIG. 9.

Here, for comparison with Examples, the tungsten carbide powder of Comparison Example 3 was subjected to synchrotron radiation X-ray diffraction analysis. The results thereof are shown in FIGS. 9 and 10. FIG. 10 is a graph which shows an enlarged portion of the diffraction profile of FIG. 9. As is evident from the graph, in the tungsten carbide powder of Comparative Example, the diffraction peak of $(W,Cr)_2C$ is at the background level. Furthermore, the intensity ratio B/A, which was measured as in Examples, was about $1.0 \times 10^{-3}$, and therefore, it can be decided that $(W,Cr)_2C$ is not formed.

In the tungsten carbide powder according to the present disclosure, the mechanism in which characteristics of the cemented carbide are improved by the chromium-concentrated region is not yet clear. However, as a result of studies performed by the present inventors, it is considered that the following points are important: (1) the apparent volume of particles is decreased by bonded bodies: (2) because of chromium-concentrated regions, the eutectic temperature of tungsten carbide and Co is decreased at grain boundaries; (3) chromium-concentrated regions improve oxidation resistance at grain boundaries, and wettability with eutectic melt is improved; and (4) during liquid-phase sintering, the chromium concentration of eutectic melt is kept uniform, and abnormal growth of tungsten carbide is inhibited.

As described above, according to the present disclosure, although tungsten carbide is in the form of fine particles, the

TABLE 3

| Sample name | Production condition | Characteristics of WC powder | | | | | | Defects in cemented carbide | |
|---|---|---|---|---|---|---|---|---|---|
| | Heat treatment temperature | Cr concentration (mass %) | Cr-concentrated region | B/A value ($\times 10^{-3}$) | Average crystal grain size (μm) | FSSS diameter (μm) | Tap density ($cm^3/100$ g) | Pore | Coarsened WC particle |
| Comparative Example 1 | 1200° C. | 2.31 | Absent | 1.39 | 0.46 | 0.52 | 27.5 | A04B02 | 9 |
| Comparative Example 2 | 1300° C. | 2.3 | Absent | 1.20 | 0.48 | 0.52 | 27.0 | A04B02 | 11 |
| Comparative Example 3 | 1400° C. | 0.97 | Absent | 1.19 | 0.70 | 0.78 | 21.5 | A02B02 | 8 |
| Comparative Example 4 | 1100° C. | 2.3 | Absent | 1.22 | 0.11 | 0.11 | 36.5 | A08B06 | 13 |
| Comparative Example 5 | 1200° C. | 2.31 | Absent | 1.24 | 0.20 | 0.20 | 31.0 | A08B06 | 9 |
| Comparative Example 6 | 1200° C. | 0.05 | Absent | 1.12 | 0.48 | 0.51 | 27 | A04B02 | 7 |
| Comparative Example 7 | 1200° C. | 0.00 | Absent | 1.17 | 0.51 | 0.53 | 25.5 | A04B02 | 6 |

The FSSS diameter in Comparative Example 4 is a BET method converted particle size.

powder volume can be decreased by bonded bodies. Furthermore, sinterability can be improved by chromium-concentrated regions.

It should be considered that the embodiments disclosed this time are illustrative and non-restrictive in all aspects. The scope of the present invention is defined not by the embodiments described above but by the appended claims, and is intended to include all modifications within the meaning and scope equivalent to those of the claims.

REFERENCE SIGNS LIST 1 tungsten carbide powder
10 bonded body
11 crystal grain
11a grain boundary
12 chromium-concentrated region

The invention claimed is:

1. A tungsten carbide powder comprising bonded bodies each including a plurality of tungsten carbide crystal grains, wherein the bonded bodies include, at a grain boundary between the plurality of tungsten carbide crystal grains, a chromium-concentrated region which has a chromium concentration higher than that in the tungsten carbide crystal grains, and further comprising a compound represented by $(W,Cr)_2C$.

2. The tungsten carbide powder according to claim 1, wherein the tungsten carbide crystal grains have an average crystal grain size of 0.6 μm or less.

3. The tungsten carbide powder according to claim 1, wherein a chromium concentration in the entire tungsten carbide powder is 0.1% by mass or more and 7.0% by mass or less.

4. The tungsten carbide powder according to claim 1, wherein an intensity ratio B/A of a $(W,Cr)_2C$ (321) diffraction intensity B to a tungsten carbide (101) diffraction intensity A measured by synchrotron radiation X-ray diffraction is $4.00 \times 10^{-3}$ or more and $20.00 \times 10^{-3}$ or less.

* * * * *